United States Patent [19]

Buzano

[11] E Re. 28,843

[45] Reissued June 8, 1976

[54] TEXTURED POLYETHYLENE TEREPHTHALATE YARNS

[75] Inventor: Michel Buzano, Villeurbanne, France

[73] Assignee: Rhone Poulenc Textile, S. A., Paris, France

[22] Filed: Aug. 1, 1974

[21] Appl. No.: 493,825

Related U.S. Patent Documents

Reissue of:

[64] Patent No.: 3,680,301
Issued: Aug. 1, 1972
Appl. No.: 74,914
Filed: Sept. 23, 1970

U.S. Applications:

[62] Division of Ser. No. 799,794, Feb. 17, 1969, abandoned.

[30] Foreign Application Priority Data

Feb. 19, 1968 France ..... 68.140387

[52] U.S. Cl. ..... 57/140 J; 428/397; 428/399

[51] Int. Cl.[2] ..... D02G 3/34; D02G 3/24; D02G 1/00

[58] Field of Search ..... 57/140 R, 157 S, 140 J; 161/173, 179; 428/397–400; 264/288–290; 28/71.3

[56] References Cited

UNITED STATES PATENTS

| | | | |
|---|---|---|---|
| 3,052,268 | 9/1962 | Seney et al. | 57/140 J |
| 3,069,726 | 12/1962 | Adams | 57/140 J |
| 3,115,437 | 12/1963 | Adams | 428/399 |
| 3,116,197 | 12/1963 | Kasey, Jr. | 57/140 J |
| 3,117,173 | 1/1964 | Adams | 264/290 |
| 3,127,915 | 4/1964 | Bottomley | 57/140 J |
| 3,184,369 | 5/1965 | Haseley | 428/399 |
| 3,185,613 | 5/1965 | Adams | 428/399 |
| 3,444,682 | 5/1969 | Polacco et al. | 57/140 J |

*Primary Examiner*—John Petrakes
*Attorney, Agent, or Firm*—Cushman, Darby & Cushman

[57] ABSTRACT

Textile articles comprise continuous filament yarns (or staple fibers obtained therefrom) of polyethylene terephthalate or another thermoplastic material, in which the individual filaments are of alternately decreasing and increasing thickness, the thinnest zones having the highest crystallinity index and molecular orientation and vice versa, but all the zones having a certain index of crystallinity, each filament having a non-spiral three dimensional crimp and a high apparent volume. The yarns are made by partially stretching the initial yarn in a crack or figure promoting agent, and relaxing the stretched yarn in two or more stages, in at least the last of which it is heated, preferably with a high temperature-time gradient.

2 Claims, 4 Drawing Figures

TEXTURED POLYETHYLENE TEREPHTHALATE YARNS

Matter enclosed in heavy brackets [ ] appears in the original patent but forms no part of this reissue specification; matter printed in italics indicates the additions made by reissue.

CROSS REFERENCE TO RELATED APPLICATIONS

This is a division of copending U.S. Pat. application Ser. No. 799,794 filed Feb. 17, 1969, *now abandoned.*

This invention relates to a new textile article comprising textured yarns of high apparent volume having a three-dimensional non-spiral crimp, and to a process and a device for the manufacture of such yarns.

A large variety of so-called textured yarns already exists, and these can be schematically classified into spirally crimped yarns and non-spirally crimped yarns. The former are obtained by twisting, setting and untwisting, generally by means of a continuous false twist process. These yarns are noteworthy for a high elasticity which must for certain applications be reduced by means of a supplementary setting treatment.

The non-spirally crimped yarns have crimps of various configurations and are generally much less elastic, which is usually not undesirable. They are obtained by various processes, using mechanical, pneumatic or mechanical-pneumatic devices. These processes suffer from the disadvantage of a relatively limited production speed as a result of the fact that moving elements are used.

Chemical processes have also been used to texture yarns. In fact it appears logical a priori to hope to obtain reproducible results more easily by chemical means.

However this method of texturizing has hitherto remained little developed because the processes which have been discovered have not given industrial results comparable to those obtained by mechanical means such as for example by false twist.

It was observed a long time ago that polyamide yarns can be cold-drawn more easily when moistened with water or with a hydroxylated non-solvent such as a lower aliphatic alcohol, a glycol or a hydroxyester.

It has been proposed to manufacture a crimped yarn by moistening an unstretched or partially stretched polyamide yarn with water, cold drawing, drying it in the untensioned state, and subjecting it to a heat treatment before or after the cold drawing but before the intensioned drying.

It was later shown that stretching synthetic yarns in such baths causes the formation of cracks or surface fissures. Starting from this observation, a process for the manufacture of slub yarns has been proposed in which the yarns are tensioned while in contact with a crack promoting agent, stretched to at least 1.01 times, and in general to approximately 2.5 times, their initial length, withdrawn from the influence of the crack promoting agent, and stretched to produce a slub yarn having an oriented structure.

It has also been proposed to manufacture textured yarns from a yarn whose structure has been rendered asymmetric during spinning by the action of a cooling agent, by tensioning it while it is in contact with a bath containing a crack promoting agent, moistening it with a liquid medium which is free from crack promoting agents, and stretching it in the moistened state. Yarns of a cracked structure have also been manufactured by maturing in a bath containing a crack promoting agent with gentle stretching and then withdrawing the yarns from the bath and stretching them strongly. However, apart from the fact that this process does not produce textured yarns but yarns having a ribbed surface, it requires several days to carry out.

All these methods either produce a product such as a slub yarn which cannot pretend to replace a textured yarn, or provide a textured yarn but use, at some stage another conventional process for obtaining a textured yarn such as asymmetric cooling of the yarn during spinning, which is an operation which is delicate to carry out.

In one aspect the present invention consists in a new textile article which comprises continuous multifilament yarns, or staple fibers obtained from such yarns, of a synthetic thermoplastic material in which each filament comprises alternating zones in which its diameter increases and decreases progressively between at least two different mean values, in which the zones of the lowest diameter correspond to the zones having the highest crystallinity index and a higher molecular orientation, each filament having a non-spiral three-dimensional crimp and a high apparent volume, all the zones in each filament having a positive degree of crystallinity.

While these textile articles can be made of any synthetic thermoplastic material, they are preferably made of a polyester, e.g. polyethylene terephthalate.

In the case of polyethylene terephthalate the crystallinity index of the thin zones is preferably between 15 and 60 percent, advantageously between 20 and 40 percent, and the crystallinity index of the thick zones is preferably less than 25 percent and advantageously between 5 and 25 percent. The molecular orientation of the thin parts is greater than that of the thick parts, the angle of orientation $\hat{p}$ of these thin parts being advantageously less than 45°. Further, the diameter of the thick zones is at least 1.01 times, and advantageously 1.05 to 1.20 times, that of the thin zones.

The overall crystallinity index value is determined by the method of W. O. Statton [Journal of Applied Polymer Science, Vol. 7, pages 803–815-(1963)], and the values for the angle of orientation by the method of W. A. Sisson [Journal of Textile Research, vol. 7, Page 425-(1937)]. The values of the crystallinity indices and of the orientation angles for the various zones are determined taking into account the crystallinity indices and overall orientation of the yarn, the proportions by volume of the various zones, the appearance of the X-ray crystallograms, comparisons of fluorescence after dyeing various zones of one and the same yarn or of several yarns, and the morphology of these zones.

Like the synthetic textured yarns, especially those based on a polyester, obtained by stretching in contact with a crack promoting agent and heat treatment in the relaxed state in a single stage, the yarns of the invention show an improved swelling, a dyeing affinity which makes it possible to dye them without carriers, and a relatively low shrinkage in boiling water, combined with good mechanical properties, especially tensile strength, and good dimensional stability, which is retained even under the influence of mechanical and/or thermal factors. This amounts to saying that the textured yarns of the invention have properties which in the past have been difficult to obtain simultaneously, such as good dimensional stability, sufficient breaking load, and great flexibility.

The invention consists also in a process for the texturizing of a continuous multifilament yarn of a synthetic thermoplastic material, especially of a polyester, by partial stretching of such a yarn in contact with a crack promoting agent followed by heat treatment in the relaxed state, in which the stretched yarn in contact with a crack promoting agent is relaxed in at least two stages, at least the last, and preferably each, of which is accompanied by a heat treatment. The last heat treatment is advantageously carried out with heat shock, i.e. is a heat treatment carried out with a sharp temperature gradient.

The crack promoting agent used can be of any known type such as an alcohol, a glycol, dimethylformamide, kerosene, perchlorethylene, a polyoxyethylenic liquid of the "Carbowax" type, pyridine, etc. Such compounds are frequently described in the literature. Preferably, relatively cheap agents such as the lower alcohols are employed.

The multiple relaxation can take place continuously or as two or more separate operations. In one practical application of the invention, the yarn is in a continuous way stretched in contact with a crack promoting agent, and subjected to two successive heat treatments in an at least partially relaxed state, the second being effected with heat shock; preferably also this second treatment is carried out on an article, e.g. a woven or knitted article, while it is completely relaxed and free from tension. This second treatment can be accompanied by a dyeing treatment and can be followed by a third heat treatment in which the yarn or other article is dried under tension. In the case of a woven fabric, this last treatment can be effected on a center frame and does not change the properties of the yarn which has been stabilized by the earlier operations, in particular the heat shock of the second treatment.

The invention also comprises a device for carrying out the above process, which comprises means for feeding the yarn, means for stretching it in a bath containing a crack promoting agent, means for relaxing it, optionally combined with heating means, and wind-up means. This device can also comprise means for carrying out treatments which are additional to, but are carried out simultaneously with, that of the invention, such as for example devices for dyeing comprising a porous wall such as described in French Pat. No. 1,502,746 of the Applicant Company.

The invention will be more particularly described by reference to the accompanying Drawing, in which.

Figure 1:
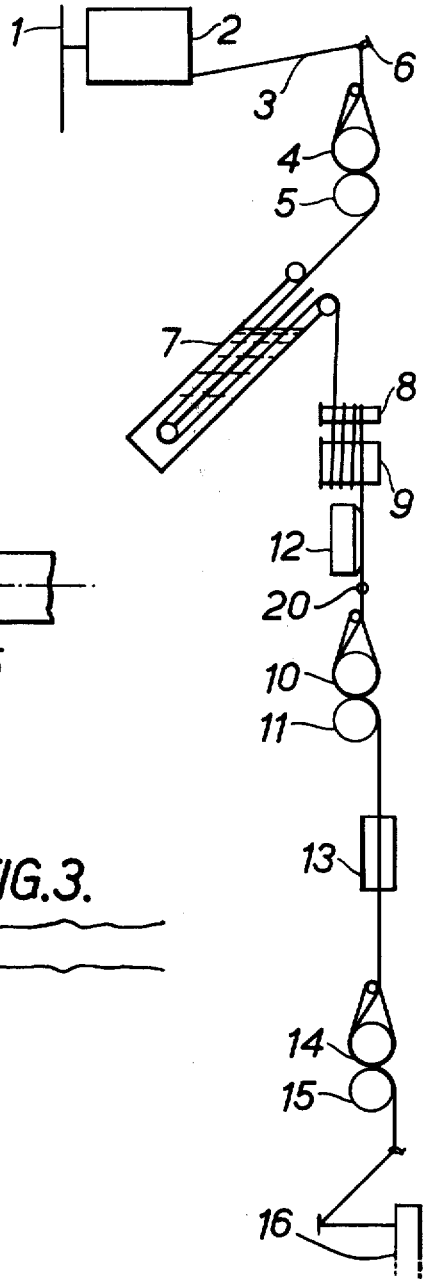
FIG. 1 is a schematic view of the device used.

Referring now to FIG. 1, a bobbin 2 mounted on a creel 1 delivers a synthetic unstretched yarn 3 which is drawn off by the feed rollers 4 and 5 after passing through a wire thread guide 6.

The yarn 3 is brought into contact with a crack-promoting agent in a vat 7 and is stretched between the system of feed rollers 4 and 5 and a first set of stretching rollers 8 and 9, and is then relaxed between this set of rollers and a set of relaxing rollers 10 and 11 while passing over a heating plate 12. The yarn thereafter passes into a heating box 13 where it undergoes a second heat treatment in the completely relaxed state, being then forwarded by relaxing rollers 14 and 15 running at a lower peripheral speed than the rollers 10 and 11. The yarn is thereafter wound up on a spindle 16 by means of a traveller-ring system.

In a variant process, the heating box 13 is omitted and the yarn undergoes its second heat treatment in the relaxed state either during a dyeing treatment or during some other finishing operation. This second heat treatment can be carried out either on the yarn or on a fabric produced from the yarn.

Figure 2:
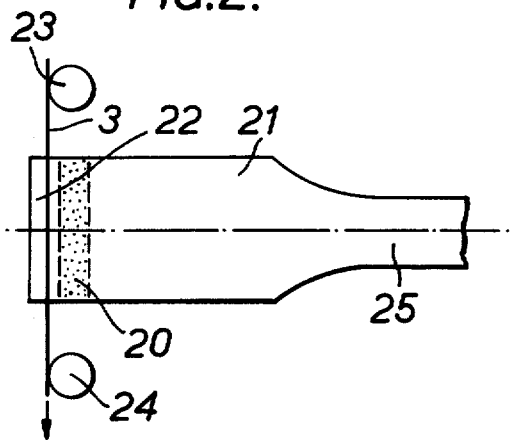
FIG. 2 is a schematic view of a device, in which the yarn is simultaneously dyed on a porous wall.

In another variant process, a dyeing device such as that described in French Pat. No. 1,502,746 is introduced between the heating plate 12 and the set of rollers 10 and 11; this device is illustrated in FIG. 2, and comprises a porous partition 20 having a smooth essentially plane surface through which the treatment liquid passes, positioned transversely in a tube 21 very close to its end. The yarn 3 passes vertically at high speed in front of the operating surface of the porous partition, between it and a cover 22. The travel of the yarn near the porous partition is controlled by two guide elements 23 and 24. The porous wall is fed with liquid via a pipeline 25.

In the illustrative Examples which follow the polyethylene terephthalate used has an intrinsic viscosity in o-chlorophenol of the usual value for textile yarns, i.e. of the order of 0.65.

EXAMPLES 1 to 5

Using the device for the first variant described above, a 22 filament yarn of polyethylene terephthalate, of filament denier 7, is stretched by a factor of 3 in an aqueous bath containing 25 percent of ethanol at ambient temperature, and is then relaxed to various degrees and at various temperatures of the plate 12. The yarn is thereafter heat treated in the completely relaxed state by immersing it in water at 40° C., progressively raising the temperature of this water to 100° C., and keeping the yarn at this temperature for 5 minutes. The yarn is thereafter dried without tension while freely exposed to the air and is then heated in an oven for 5 minutes at 180°C.

The degree of relaxation is set by the overfeed of the yarn between the set of rollers 8, 9 and the set of rollers 10, 11.

The results obtained are given in the Table below:

| EXAMPLE | 1 | 2 | 3 | 4 | 5 |
|---|---|---|---|---|---|
| Degree of relaxation in % | 12.6 | 26.8 | 8.2 | 1.3 | 4.8 |
| Temperature of the plate 12 in °C. | 190 | 190 | 130 | 95 | 95 |
| Shrinkage in boiling water in % | 11.7 | 6.7 | 12 | 17 | 13 |
| Shrinkage in steam at 130°C. in % | 7.4 | 3.6 | 10.5 | 15.9 | 11.9 |
| Sponge effect in % | 1.82 | 3.7 | 1.3 | 1.5 | 1.4 |
| Bulk in $cm^3/g$ | 1.7 | 2.2 | 1.5 | 1.6 | 1.6 |
| Creep in % | 1 | 1.4 | 0.8 | 0.7 | 0.6 |

The bulk is as given by the Koningh test.

The crimp effect is determined by measuring a length $l_1$ of the yarn under a load of 0.05 g/den, and then leaving the yarn for 24 hours under a load of 0.001 g/den and again measuring the length $l_2$. The crimp effect is given by the ratio $(l_1 - l_2)/(l_1) \times (100)$.

The shrinkage in boiling water is determined in the following manner: a length $L_1$ (measure under a load of 0.05 g/den) of the yarn is dipped into boiling water for 2 minutes, dried in an oven at 100° C. for 30 minutes, and suspended and left at rest for 15 minutes; the load of 0.05 g/den is then again applied, and the new length $L_2$ of the yarn is measured, the shrinkage in boiling water being given by the formula:

$$(L_1 - L_2)/(L_1) \times (100)$$

The residual shrinkage of the yarn in steam at 130° C. is measured in the same manner, except that the yarn, in place of being immersed in boiling water for 2 minutes, is placed in an autoclave in which the temperature rises to 130° C. over 15 minutes, the yarn remains at 130° C. in the saturated steam for a further 15 minutes.

The creep is given by the permanent deformation assumed by a yarn after applying a load of the order of 40 percent of the breaking load.

EXAMPLE 6

A polyethylene terephthalate yarn of the same structure as in Example 1 is stretched by a factor of 3 in an aqueous bath containing 25 percent of ethanol at ambient temperature. This yarn is then relaxed by 2.9 percent without heat treatment, that is to say without using the heating plate 12.

The yarn is then given a treatment identical with the second heat treatment of Example 1.

The yarn obtained has the following characteristics:

| | |
|---|---|
| Shrinkage in boiling water | 14.7% |
| Shrinkage in steam at 130°C. | 17.40% |
| Crimp | |
| Sponge effect in % | 1.01 |
| Bulk in $cm^3/g$ | 1.4 |
| Creep in % | 0.7 |

EXAMPLE 7

The purpose of this Example is to demonstrate the advantage of heat shock during the second heat treatment.

A polyethylene terephthalate yarn of the same structure as before is stretched by a factor of 3.3 in an aqueous bath containing 25 percent of ethanol at ambient temperature. This yarn is subjected to a first heat treatment on the plate 12 at a temperature of 195° C., with a relaxation of 22.5 percent.

The yarn is thereafter developed by means of a second heat treatment in steam in the completely relaxed state, firstly without heat shock, by placing the yarn above a vessel containing water and raising the water to the boil, so causing a relatively gradual evolution of steam, and secondly with heat shock, by suddenly introducing the yarn into the chamber filled with steam at the same temperature as before.

Figure 3:
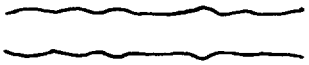
FIG. 3 is a schematic representation of a filament or yarn prepared according to the present process but without heat shock.
Figure 4:
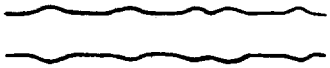
FIG. 4 is a schematic representation of the same filament but treated with heat shock.

FIGS. 3 and 4 give a schematic representation of a constituent filament of this yarn after treatment without and with heat shock respectively.

In the first case the filament has a mean diameter of $20\mu$ and the variations in diameter are very slight.

In the second case the mean diameter is slightly increased to $21\mu$, and the mean diameter of the thick parts is $23\mu$.

It is found that the heat shock slightly disorients the thickest zones of the filament, causing greater shrinkage and slubbing., accompanied by a greater crimp, the yarn which has been treated without heat shock in fact having 56 half-waves, and the yarn which has been treated with heat shock having 90 half-waves, both over a length of 10 cm.

The second yarn furthermore has a filament denier of 3.3 as opposed to 3.04, and its elongation at break is 93 percent instead of 81 percent. The tenacity of both yarns is about 3.3 g/den., the shrinkage in boiling water 12 percent, the crimp effect 1.05 percent, the bulk 1.6 $cm^3/g$ and the creep 1.0 percent.

In both cases the molecular structure is essentially the same; the thin parts have a mean crystallinity of 20 to 25 percent and a good molecular orientation (angle $\hat{p} = 25°$ to 30°). The thick parts are unoriented and their crystallinity index is about 10 percent, the mean crystallinity index of the yarn being about 20 percent.

Yarns according to the invention yield fabrics of pleasant appearance and handle, and furthermore possess particularly valuable dyeing affinity, as can be demonstrated in the following manner:

A yarn according to the invention and a standard polyethylene terephthalate yarn are both dyed with a mixture of dyestuffs consisting of:

0.3 percent by weight of "Disperse Orange 11" – (C.I. 60,700)

0.4 percent of "Disperse Violet 1" – (C.I. 61,100) and 4 percent of "Disperse Blue 9" – (C.I.61,115).

(The names of the dyestuffs are those in the Color Index). Two pieces knitted with a mixture of these two yarns are dyed by immersion in a bath which is initially at 40° C., and which is then heated progressively at a rate of temperature rise of 1° C. per minute up to 90° C., at which it remains for 90 minutes.

It is found that the standard yarn has not been dyed, while the yarn of the invention has assumed a navy blue shade with good fastness to washing, to perspiration and to light, as shown by the following results measured according to the measurements of the E.C.E. Code (2nd. edition, 1958 and supplements). (This E.C.E. Code is published by "The Association for the Study and Publication of Methods for the Determination of Fastness Properties," 12 rue d'Anjou, Paris 8°.)

| | |
|---|---|
| Fastness to washing at 60°C. | % |
| Fastness to perspiration | % |
| Fastness to artificial light | % |

The same experiment is repeated, but this time adding 7 g/liter of a carrier, namely sodium o-phenylphenate, to the dyeing composition. The standard yarn still does not accept the dye, while the yarn according to the invention shows a slightly more intense navy blue shade than in the preceding experiment.

As illustrated by these Examples it is possible, by means of the present invention, directly and continuously to obtain, from extrusion spinning, a bulk textured synthetic yarn which is dimensionally stable, easy to dye, particularly valuable in knitting and weaving, and able to suit all other textile applications either in the form of a continuous yarn or in the form of staple fibers.

What is claimed is:

1. Textile articles comprising multi-filament polyethylene terephthalate yarns, in which each filament consists of alternating zones whose diameter progressively increases and decreases respectively between at least two different mean values, the parts of lowest diameter having the highest crystallinity index and molecular orientation, the crystallinity index in the thinner parts of the filaments being between 15 and 60 percent and that in the thicker parts being between 5 and 25 percent but always lower than that in the thinner parts, each filament having a non-spiral three-dimensional structure and a high apparent volume.

2. Textile articles according to claim 1, in the form of continuous multifilament yarns.

* * * * *